(12) United States Patent
Howe

(10) Patent No.: US 8,301,408 B2
(45) Date of Patent: Oct. 30, 2012

(54) TEMPERATURE PREDICTION TRANSMITTER

(75) Inventor: Spencer K. Howe, Scituate, MA (US)

(73) Assignee: Invensys Systems, Inc., Foxboro, MA (US)

( * ) Notice: Subject to any disclaimer, the term of this patent is extended or adjusted under 35 U.S.C. 154(b) by 303 days.

(21) Appl. No.: 12/720,355

(22) Filed: Mar. 9, 2010

(65) Prior Publication Data

US 2011/0224940 A1 Sep. 15, 2011

(51) Int. Cl.
G06F 15/00 (2006.01)
(52) U.S. Cl. ................................... 702/130
(58) Field of Classification Search ............. 702/130; 600/544; 73/861.356; 375/224
See application file for complete search history.

(56) References Cited

U.S. PATENT DOCUMENTS

| | | | |
|---|---|---|---|
| 3,417,617 A | 12/1968 | Rall | |
| 3,487,213 A | 12/1969 | Horan et al. | |
| 3,493,949 A | 2/1970 | Servos et al. | |
| 3,759,083 A | 9/1973 | Erickson et al. | |
| 3,878,724 A | 4/1975 | Allen | |
| 3,892,281 A | 7/1975 | Brown | |
| 3,969,943 A | 7/1976 | Ohno et al. | |
| 3,972,237 A | 8/1976 | Turner | |
| 4,092,863 A | 6/1978 | Turner | |
| 4,140,999 A | 2/1979 | Conway | |
| 4,178,798 A | 12/1979 | Wessel | |
| 4,221,125 A | 9/1980 | Oliver et al. | |
| 4,232,682 A | 11/1980 | Veth | |
| 4,380,155 A | 4/1983 | Paddock et al. | |
| 4,470,710 A | 9/1984 | Crane et al. | |
| 4,537,067 A | 8/1985 | Sharp et al. | |
| 4,556,329 A | 12/1985 | Benson et al. | |
| 4,562,554 A | 12/1985 | Stixrud et al. | |
| 4,605,314 A | 8/1986 | Stenmark | |
| 4,815,323 A | 3/1989 | Ellinger et al. | |
| 2004/0023559 A1 | 2/2004 | Wu | |
| 2004/0024559 A1 | 2/2004 | Down et al. | |
| 2004/0192196 A1 | 9/2004 | Kim et al. | |
| 2005/0145273 A1 | 7/2005 | Atwood et al. | |
| 2006/0156830 A1 | 7/2006 | Drahm et al. | |
| 2006/0209921 A1 | 9/2006 | Brown et al. | |
| 2007/0008200 A1 | 1/2007 | Hsieh et al. | |
| 2007/0027639 A1* | 2/2007 | Henry et al. | 702/45 |
| 2007/0069931 A1 | 3/2007 | Hsieh et al. | |
| 2007/0200193 A1 | 8/2007 | Horn | |
| 2007/0252633 A1 | 11/2007 | Frankel et al. | |
| 2008/0025369 A1 | 1/2008 | Patel et al. | |
| 2009/0277271 A1 | 11/2009 | Seppa et al. | |
| 2009/0277281 A1 | 11/2009 | Henry et al. | |

* cited by examiner

*Primary Examiner* — Bryan Bui
(74) *Attorney, Agent, or Firm* — Edward S. Jarmolowicz, Esq.

(57) ABSTRACT

A system and method is provided for predicting a physical quality such as temperature, the measurement of which tends to be hindered by a time-related impediment. A single sensor is configured to detect, in real time, the physical quality $Q_{detect}$, and one or more infinite impulse response filters are configured with time constants correlated to the time-related impediment. The infinite impulse filter(a) are configured to filter $Q_{detect}$ to output a filtered quality measurement ($Q_{filtered}$). A processor is configured to calculate, in real time, the estimated or predicted quality $Q_{estimate}$ using $Q_{detect}$ and $Q_{filtered}$.

43 Claims, 10 Drawing Sheets

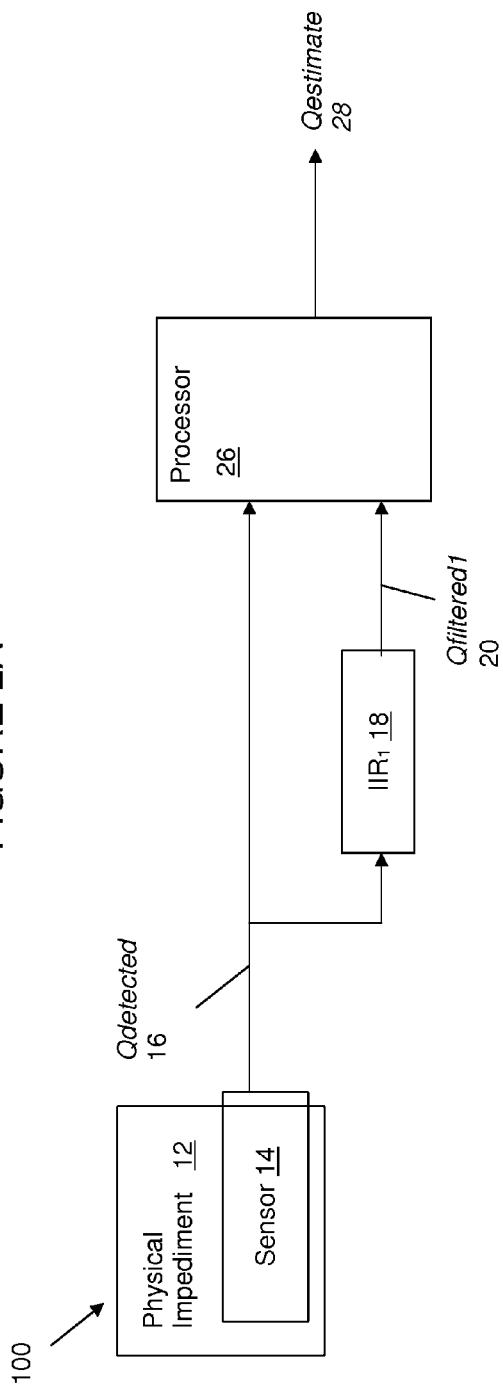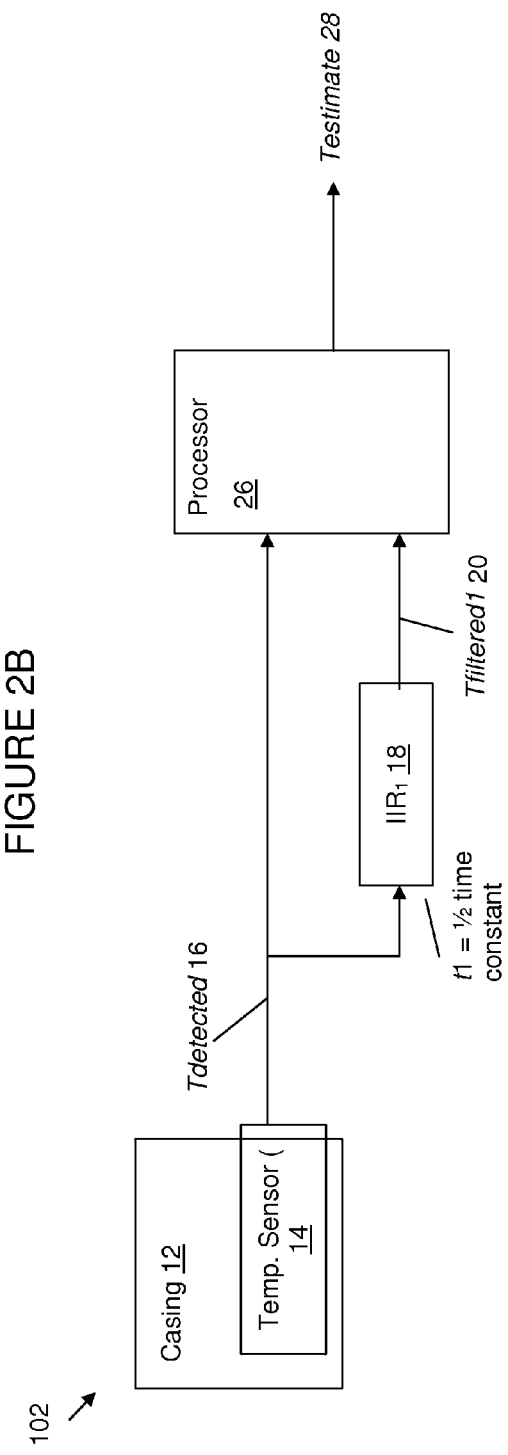

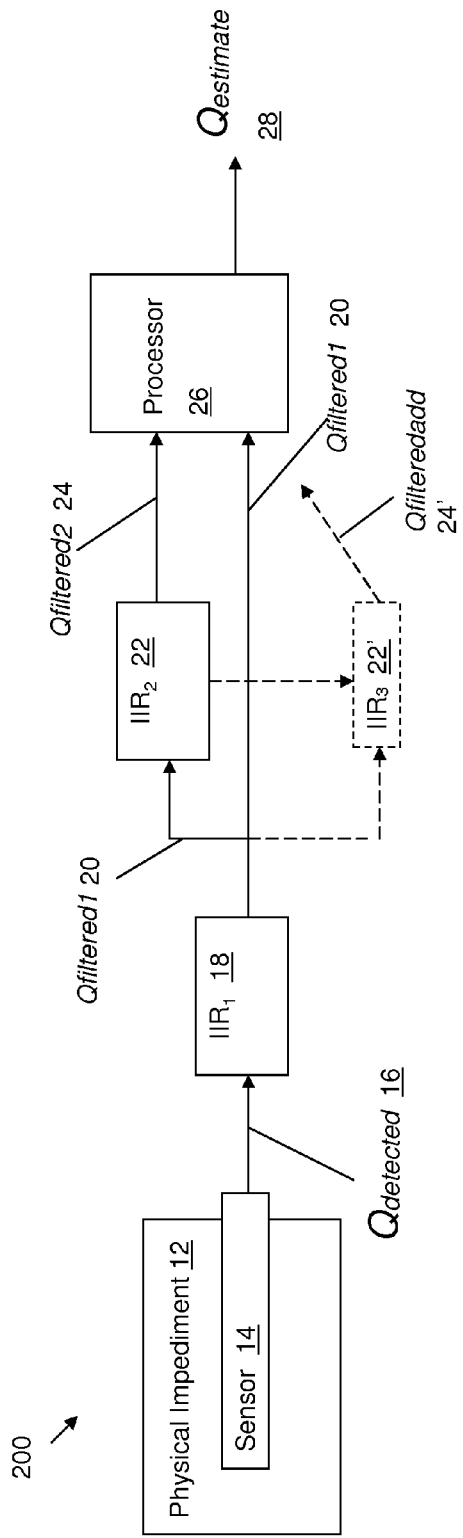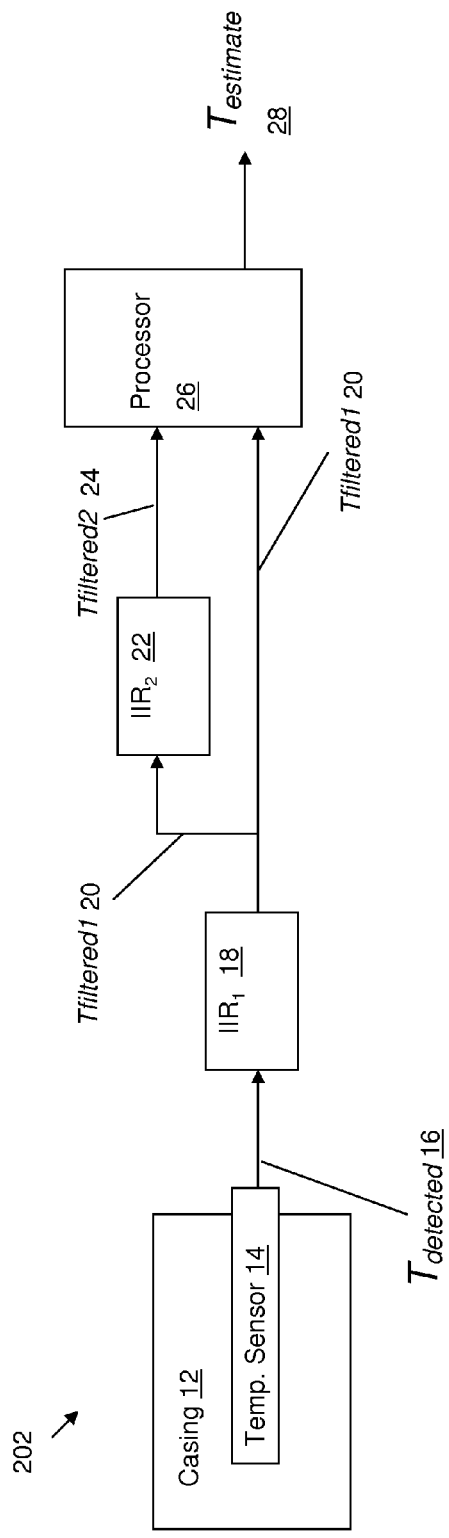

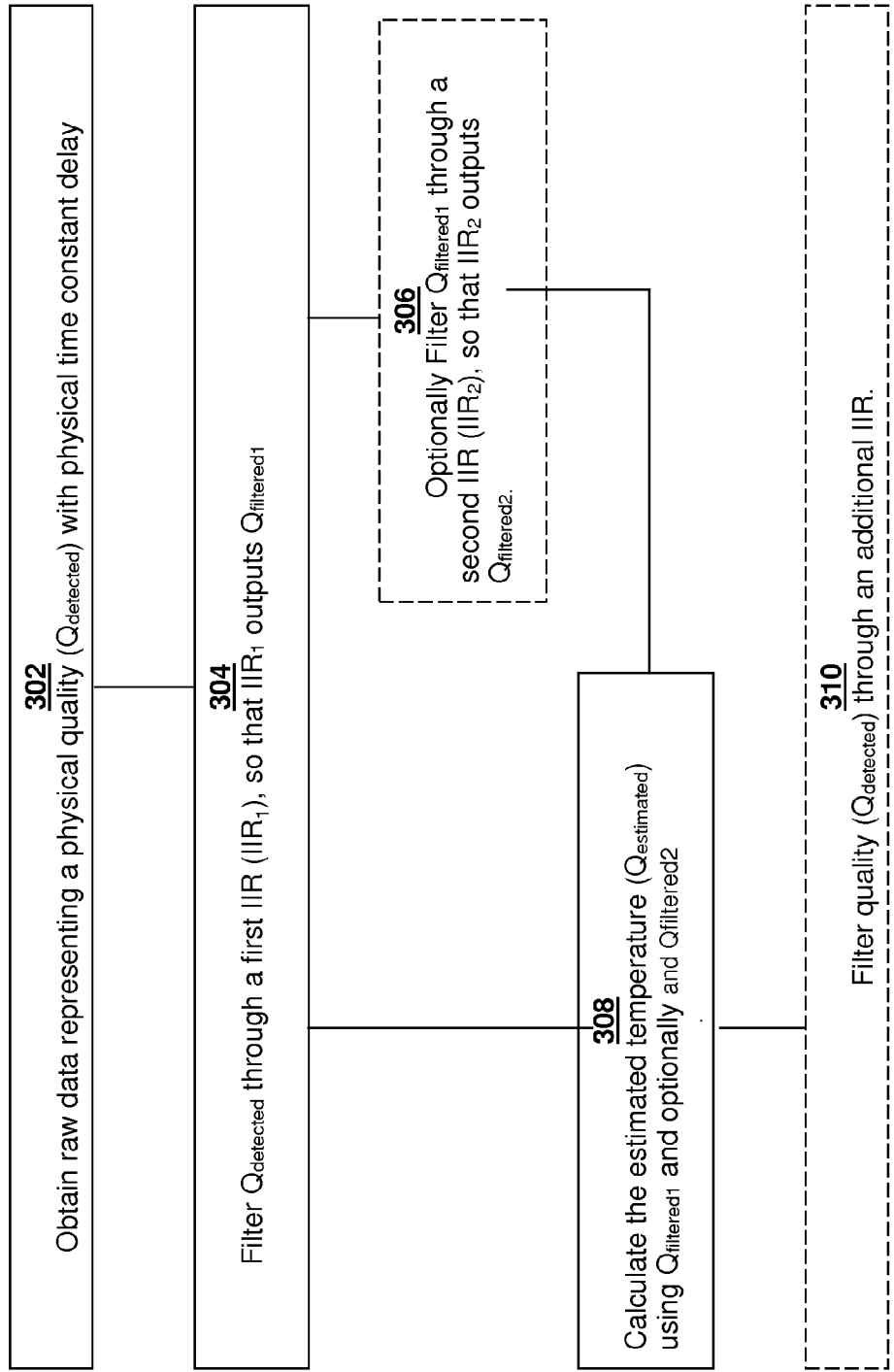

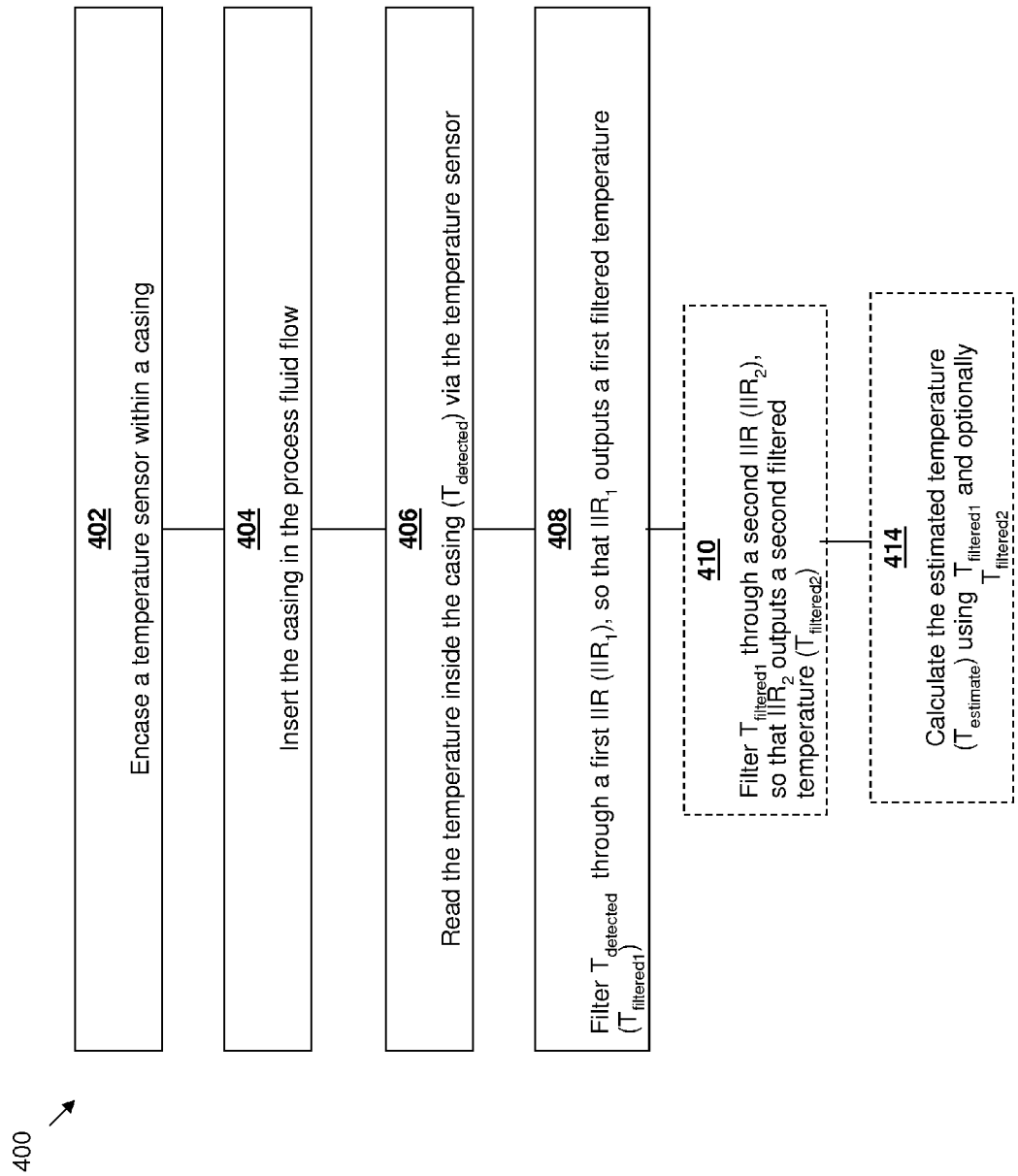

TEMPERATURE PREDICTION TRANSMITTER

BACKGROUND

1. Technical Field

This invention relates to the estimation of a signal with a physical time delay, and more particularly to a system of reducing or compensating for the time delay caused by a physical impediment in a signal using an infinite impulse response ("IIR") filter.

2. Background Information

Signals from sensors for a variety of physical phenomena (such as pressure, temperature, flow, acceleration, heat flux, and optical intensity) may be delayed by a physical impediment. For example, in order to measure the temperature of a process fluid flowing through a conduit, a temperature sensor may be positioned in the fluid flow. However, it is often necessary to physically separate the temperature sensor from the fluid flow, e.g., due to compatibility issues. For example, the process fluid to be measured may be chemically incompatible with metallic temperature sensors, e.g., resulting in chemical attack or contamination of the solution and/or electrodes. In addition, the fluid may damage the temperature sensor, and build up of process fluid on the sensor may decrease the sensor's sensitivity. The fluid may also be part of a sanitary process, in which foreign objects such as sensors should not contact the process fluid. These issues may thus tend to preclude the placement of conventional temperature detectors in direct contact with the process fluid.

A conventional approach is to place the temperature sensor within a protective casing. With such a casing, the temperature sensor may be placed within the process fluid flow, while being protected from the process fluid by the casing. This approach relies on thermal conduction through the casing wall to the temperature sensor, to obtain temperature data. A drawback of this traditional solution is that the casing acts as a temperature insulator, thus impeding the sensor's ability to detect temperature change.

In typical examples, casings for temperature detectors to be placed in conduits containing corrosive fluids are fabricated from polymers such as PFA (perfluoroalkoxy polymer resin), PTFE (polytetrafluoroethylene), polyvinyl chloride (PVC), or various combinations thereof, such as perfluoroalkoxy-polytetrafluoroethylene co-polymer. The relatively poor thermal conductivity of these materials tends to adversely affect the accuracy and response time provided by such external temperature detection approaches. Some techniques for compensating for the inaccuracy and delay of such temperature sensors involve the use of additional temperature sensors, including sensors positioned on the outside of the conduit for the process fluid flow. Differences between the signals captured from these multiple sensors may be used to help estimate or otherwise compensate for the time delay. These techniques, however, may be impractical for many applications, such as those involving relatively complicated, expensive casings, such as those which may contain other devices in addition to sensors. It may thus be cost prohibitive to use multiples of these relatively expensive, complicated casings on the conduit.

Referring to the chart of FIG. 1A, the temperature 23 detected by a conventional temperature sensor in a polymer casing is plotted relative to actual process fluid temperature 21. As can be seen from the chart, there is a time lag between the process fluid temperature 21 and the detection of the temperature 23 by the sensor. In addition, the detected temperature 23 has a relatively flattened amplitude and fails to reach the highs and lows of the process temperature 21.

Turning to FIG. 1B, one attempt to overcome these drawbacks includes passing a signal 7, generated by the temperature sensor 3 within casing 5, through a conventional filter 9. Conventional filter 9 is used to process the signal to reduce noise (e.g., electrical interference from electronic hardware), such as by using averaging techniques to filter out electronic noise and to output a conventionally estimated temperature 11.

As can be seen in FIG. 1C, this conventionally filtered signal 25, while it may tend to reduce signal noise, tends not to compensate for the time lag. Rather, the conventionally filtered signal 25 may be viewed as increasing the time lag.

A need therefore exists for a system that compensates for, or otherwise mitigates the effect of time-related impediments to accurate quality measurements, without the need for multiple sensors.

SUMMARY

In an aspect of the invention, a system for predicting, in real time, a physical quality with an impediment to accurate measurement, includes a sensor configured to detect a physical quality ($Q_{detect}$), wherein measurement of the physical quality is subject to an impediment. The system includes an infinite impulse response filter (IIR) configured to filter $Q_{detect}$ and to output a first filtered quality measurement ($Q_{filtered1}$) in real time. A processor is configured to calculate the estimated quality $Q_{estimate}$ using $Q_{detect}$ and $Q_{filtered1}$.

In a variation of the foregoing aspect, the physical quality is temperature of a process fluid, as detected by a resistive temperature detector (RTD), with the physical impediment being a thermally insulative protective casing.

In another aspect of the invention, a method for transforming raw physical quality data into an estimated measured quality, includes obtaining raw data representing a physical quality ($Q_{detect}$), in which an impediment exists to the detection of the physical quality. The method also includes filtering $Q_{detect}$ through an IIR, so that the IIR outputs $Q_{filtered1}$; and calculating, the a processor in real time, the estimated measured quality ($Q_{estimate}$) using $Q_{filtered1}$ and $Q_{detect}$.

In variations of each of the foregoing aspects, multiple IIR filters may be used to enhance output accuracy.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIG. 2A is a block diagram of a system associated with an embodiment of the present invention;

FIG. 2B is a block diagram of a system associated with an embodiment of the present invention;

FIG. 3A is a block diagram of a system associated with an embodiment of the present invention;

FIG. 3B is a block diagram of a system associated with an embodiment of the present invention;

FIG. 4 is a flowchart of a method associated with an embodiment of the invention;

FIG. 5 is a flowchart of a method associated with an embodiment of the invention;

DETAILED DESCRIPTION

Figure 1A:
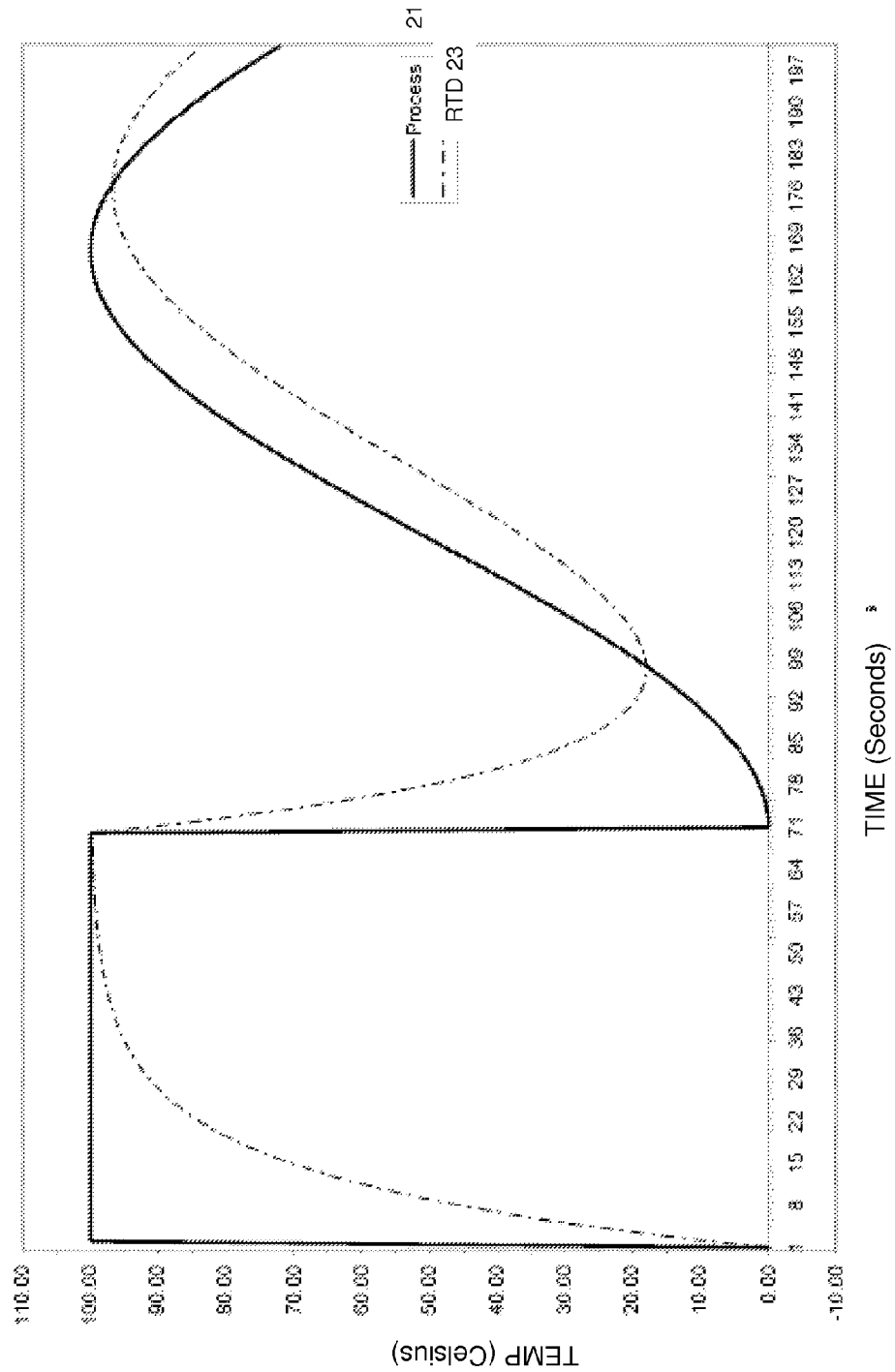
FIG. 1A is a chart of a model of prior art temperature detection of process fluid flowing through a conduit.
Figure 1B:
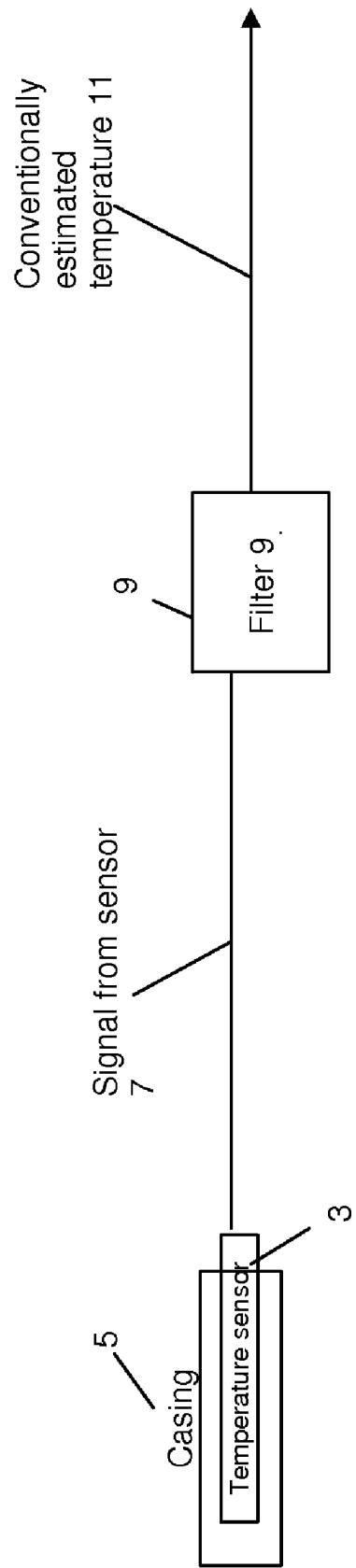
FIG. 1B is a block diagram of prior art.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Briefly, the inventor discovered that an otherwise conventional infinite impulse response (IIR) filter (e.g. "Kalman" or other low pass filters) may be configured to mimic, in real time, a physical system in which a physical impediment (e.g., a time-related impediment) is responsible for unwanted time delays in a sensor's detection of a physical property. As a specific example, the inventor discovered that such an IIR filter may be configured to mimic the effects that the aforementioned RTD (or thermister or thermocouple, etc.) casing would generate in delaying the process temperature from reaching the sensor. In particular, the inventor hypothesized that programming an IIR with a time constant correlated to that of the physical impediment would mimic this physical impediment. The inventor then discovered that this specially configured IIR filter may be used to effectively predict the temperature that would ultimately reach the RTD, to thus substantially eliminate the time delay to provide enhanced, i.e., nearly instantaneous, real time temperature detection.

Figure 1C:
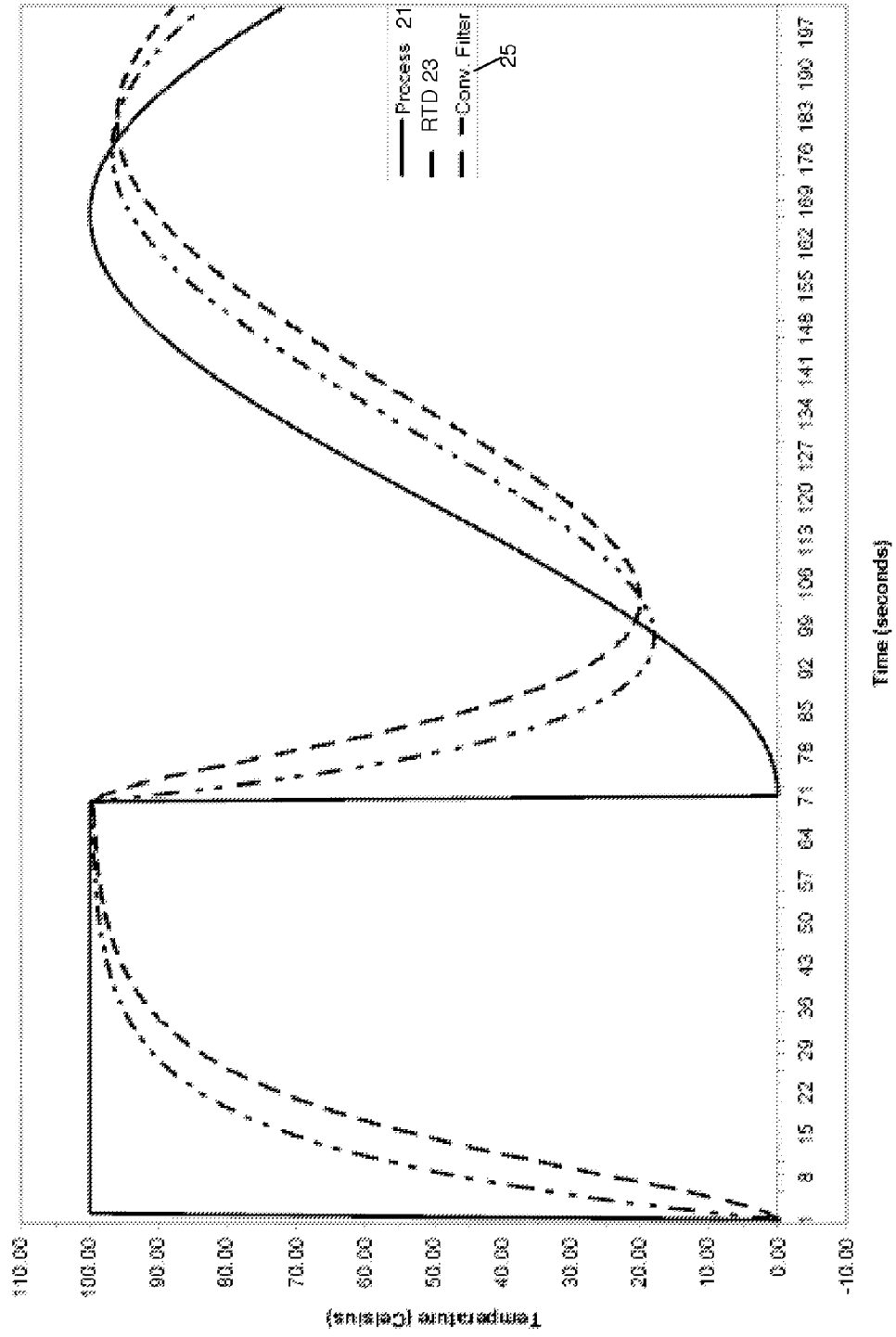
FIG. 1C is a chart of a model based on the prior art of FIG. 1B.

As alluded to above, using a filter in an attempt to reduce time delay is counterintuitive, since filters themselves tend to slow down and attenuate the actual transmission of a signal passing therethrough (see, e.g., FIG. 1C as discussed above). However, as will be discussed hereinbelow, the inventor surprisingly found that use of an IIR filter configured with a time constant correlated to the physical impediment, could be used to effectively reduce or substantially eliminate the time delay in the sensor's detection of the temperature. The inventor further found that adding yet another filter may further enhance the quality of the processed data, i.e., by providing additional outputs for use in a mathematical model capable of predicting a quality such as temperature.

These approaches thus capture multiple, sequential outputs from a single temperature sensor, and effectively predict where the temperature of this single temperature sensor will ultimately settle, for improved temperature response times.

Optionally, a second infinite impulse filter may be used in conjunction with the first filter, with the difference between the two filters being used to make further corrections. As will be discussed in greater detail below, the second filter may be a substantial duplicate of the first filter, but which in particular embodiments uses a time constant that may be greater than that used in the first filter. (The time constants used may vary depending on the particular material e.g., casing, through which the temperature must propagate.)

Functionally, the filters are similar to conventional RC circuits in which some part of a new measurement and some part of the previous reading are mixed together linearly (e.g., some fraction of the new measurement and the complementary fraction of the last reading). The response is thus similar to the exponential response of an RC electrical circuit, to effectively provide an exponential, or 'infinite' response, from a single sensor. An aspect of the invention is thus the realization that the response coming through the casing to the temperature sensor from a change in the measured temperature may be modeled substantially accurately using this single or double-filtering approach. With the correct time constants, these embodiments enable one to effectively see how much of the remaining (exponential) heat transfer hasn't yet arrived, and then optionally filter again with a longer time constant so the difference is effectively corrected.

As used herein, the term "real time" refers to operations effected nearly simultaneously with actual events, such as to provide results which are delayed nominally only by the execution speed of the processor(s) used.

Turning to FIG. 2A, an embodiment of the invention shown as system 100 includes sensor 14, having a physical constraint (impediment) 12. Sensor 14 is configured to detect a physical quality, $Q_{detected}$ 16. An IIR filter, $IIR_1$ 18, is configured to filter $Q_{detected}$ 16 using a constant $k_1$, and to output first filtered reading $Q_{filtered1}$ 20. Constant $\tau_1$ is predetermined to correlate to the known physical impediment 12. Processor 26 is configured to accept inputs $Q_{detected}$ 16 and $Q_{filtered1}$ 20, and to use these two inputs to produce $Q_{estimate}$ 28, e.g., using Equation 1 below.

$$Q_{estimate} = 2 \times Q_{detected} - Q_{filtered1} \qquad \text{Eq. 1}$$

Although a single IIR filter may be used as shown, it should be recognized that additional IIR filters may be used, to provide enhanced results in many applications, as will be discussed below.

In particular examples, quality Q may be temperature and constant $\tau$ may be a time constant which correlates to a time delay associated with a barrier that is a relatively poor thermal conductor, as discussed below with respect to FIG. 2B. This embodiment may be particularly useful with temperature sensors used in a corrosive process fluid. For example, a resistance temperature detector ("RTD") may be encased in polypropylene and inserted into relatively corrosive chemical process fluids. While the polypropylene may protect the RTD from the process fluid, it has relatively low thermal conductivity, and therefore a relatively large time constant (delay), e.g., which may be measured in minutes rather than seconds.

Referring now to the embodiment shown as system 102 of FIG. 2B, sensor 14 is a temperature sensor 14, within a protective casing 12, wherein the temperature sensor 14 is configured to detect $T_{detected}$ 16, which is the temperature inside the casing 12. In this embodiment, the IIR filter, $IIR_1$ 18, is configured to filter $T_{detected}$ 16 using a time constant $\tau_1$, and to output first filtered temperature reading $T_{filtered1}$ 20. Time constant $\tau_1$ is set to approximately one half of the known time delay caused by the relatively low thermal conductivity of the casing 12. In the embodiment shown, processor 26 is configured to accept inputs $T_{detected}$ 16 and $T_{filtered1}$ 20, and to use these two inputs to produce $T_{estimate}$ 28.

With reference now to FIGS. 3A & 3B, the inventor noted that in some applications, combining the outputs of two (or more) IIR filters yielded improved results. (Specific experimental results are discussed hereinbelow in reference to FIGS. 7-9.) Such a multiple-filter system is shown at 200 in FIG. 3A, and is substantially similar to system 100, but for the addition of a second IIR filter, $IIR_2$ 22 configured to receive and process $Q_{filtered1}$ 20, and to output $Q_{filtered2}$ 24. $IIR_2$ 22 is thus configured to re filter $Q_{filtered1}$ 20 to provide a second input, $Q_{filtered2}$ 24, for processor 26. The first and second IIRs are each programmed with time constants correlated to the physical impediment 12 delaying the detection by sensor 14. In general, the time constant ($\tau_2$) of the second IIR filter may be configured to be greater than or substantially equal to time constant ($\tau_1$) of the first IIR filter. In particular exemplary embodiments shown and described herein, both IIRs were programmed with time constants of approximately one half that of the physical impediment 12.

Processor 26 is thus configured to receive both $Q_{filtered1}$ 20, from $IIR_1$ 18, and $Q_{filtered2}$ 24, from $IIR_2$ 22. Processor 26 is also configured to process these inputs to produce estimated temperature, $Q_{estimate}$ 28. In particular embodiments, for example, the processor may be configured to calculate $Q_{estimate}$ 28 by the following Equation 2, i.e., by subtracting the value of $Q_{filtered2}$ 24 from twice the value of $Q_{filtered1}$ 20, or by Equation 3, both of which have been found to yield similar results in many applications.

$$Q_{estimate} = (2 \times Q_{filtered1}) - Q_{filtered2} \qquad \text{Eq. 2}$$

$$Q_{estimate} = Q_{filtered2} + (Q_{filtered2} - Q_{filtered1}) \qquad \text{Eq. 3}$$

Optionally, additional IIRs may be added, such as shown in phantom in FIG. 3A as $IIR_3$ 22'. Such additional IIRs may be disposed in series or in parallel with any of the other IIRs. These additional IIRs may be used to either further refine an estimated quality, or to model another physical impediment that may be present within the system such as in the event an RTD casing is placed within another casing. For example, an additional IIR 22' may be placed in parallel with IIR 22, with both receiving either $Q_{detected}$ or $Q_{filtered1}$, to then feed their outputs $Q_{filtered2}$ and $Q_{filteredadd}$, respectively, to processor 26. The processor 26 may then use the following Equation 4 to calculate Qestimate:

$$Q_{estimate} = Q_{filtered1} + (Q_{filtered1} - Q_{filtered2}) + (Q_{filtered1} + Q_{filteredadd}) \qquad \text{Eq. 4}$$

As discussed above, any of the embodiments disclosed herein may be configured in which the physical quantity to be measured is temperature. Such a system is shown at 202 in FIG. 3B, which is substantially similar to system 200 (FIG. 3A), in which sensor 14 is a temperature sensor, the physical impediment is the relatively poor thermal conductivity of a casing 12, and the time constants of the IIR filters $IIR_1$ 18, and $IIR_2$ 22 are correlated to the time constant of the casing.

In this embodiment, the second IIR filter, $IIR_2$ 22, is configured to receive and re-filter $T_{filtered1}$ 20, to output $T_{filtered2}$ 24. Processor 26 is configured to receive both $T_{filtered1}$ 20, from $IIR_1$ 18, and $T_{filtered2}$ 24, from $IIR_2$ 22, and to generate estimated temperature, $T_{estimate}$ 28. Thus, in this example, a raw signal from a single temperature sensor is processed in series through both the first and second IIR filters, creating an "in series" output, and is also processed separately through the first IIR filter, creating a "first filter" output. The "in series" output and the "first filter" output may be combined to determine the estimated temperature.

As mentioned above, in particular embodiments, the processor 26 may be configured to combine the filtered outputs to produce $T_{estimate}$ 28 using the aforementioned Equation 1, 2, 3 and/or 4, in which Q=temperature T.

As discussed above, the time constants are matched to the casing material, e.g., they are set to one-half that of the casing in particular embodiments. The time constant for a particular casing may be discovered empirically, e.g., by sending process fluid of a known temperature through a conduit, and measuring the time required for a temperature sensor in the casing to reach the known fluid temperature.

The various embodiments of the subject invention may provide improved speed and accuracy, relative to conventional approaches by modeling the expected delay to effectively predict where the measured quality (e.g., temperature) will settle. Moreover, any of these embodiments may be further configured to use Equation 5, discussed hereinbelow, to further reduce the time delay for enhanced, nominally real time output.

Embodiments of the claimed invention also involve methods for predicting a physical quality in applications involving a time-related impediment, such as predicting the temperature of a process fluid using a temperature sensor disposed within a casing. For convenience, these methods will be shown and described with respect to temperature measured by a sensor disposed within an insulative casing or with any other barrier disposed between the sensor and the substance being measured. It should be recognized, however, that any one or more of the embodiments shown and described herein may be used to analyze substantially any quality for which speed of detection may be hindered by some physical impediment. Some non-exclusive examples of such qualities may include temperature, pressure, flow, density, concentration, pH, ORP, index of refraction, turbidity, weight, mass, luminosity, position, etc. Moreover, it should be recognized that these qualities may be measured with substantially any type of sensor, including electronic, mechanical, electro-mechanical, chemical, and/or electro-chemical sensors, etc.

Turning now to FIG. 4, a method for transforming raw sensor data representing a physical quality having a physical time constant (delay), into an estimated or predicted value, is shown as method 300. This method includes 302, obtaining raw data representing temperature ($T_{detected}$) inside a casing within process fluid flow; 304, filtering $T_{detected}$ through a first IIR ($IIR_1$), so that IIR1 outputs $T_{filtered1}$ ; 306, optionally filtering $T_{filtered1}$ through a second IIR ($IIR_2$), so that $IIR_2$ outputs $T_{filtered2}$ and 308, calculating the estimated temperature ($T_{estimate}$) using $T_{filtered1}$ and optionally, $T_{filtered2}$. This method may also be used with more than two IIR filters, such as shown optionally at 310.

Turning now to FIG. 5, a method 400 is shown for modeling an estimated temperature of a process fluid flow. This method includes 402, encasing a temperature sensor within a casing; 404, inserting the casing in the process fluid flow; 406, reading the temperature inside the casing ($T_{detected}$) via the temperature sensor; 408, filtering $T_{detected}$ through a first IIR ($IIR_1$), so that $IIR_1$ outputs a first filtered temperature ($T_{filtered\ 1}$). Method 400 optionally includes 410, filtering $T_{filtered1}$ through a second IIR ($IIR_2$), so that $IIR_2$ outputs a second filtered temperature ($T_{filtered2}$). At 414, the estimated temperature ($T_{estimate}$) is calculated using $T_{filtered1}$ and optionally, $T_{filtered2}$.

Figure 6:
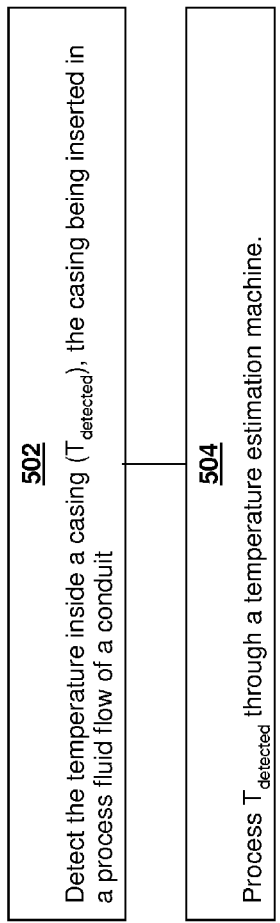
FIG. 6 is a flowchart of a method associated with an embodiment of the invention.
Figure 7:
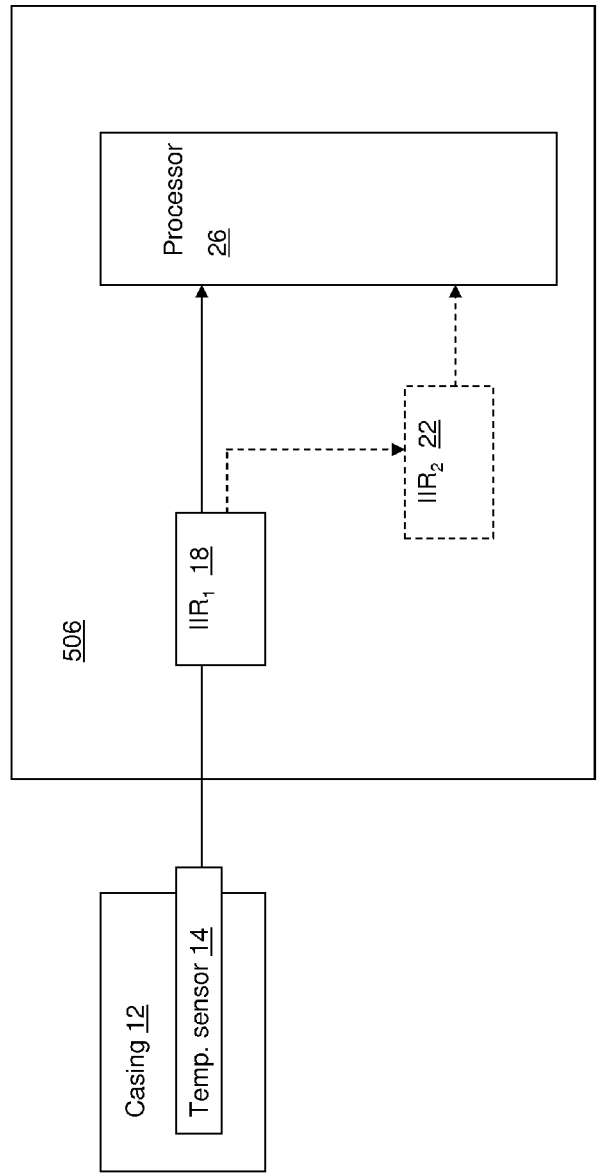
FIG. 7 is a block diagram of a system associated with an embodiment of the present invention.

Method 500 of FIG. 6 is a method for estimating the temperature of a process fluid flow. This method includes 502, detecting the temperature inside a casing ($T_{detected}$), the casing being inserted in a process fluid flow of a conduit; and 504, processing $T_{detected}$ using a temperature estimation transmitter 506 (FIG. 7). As shown, transmitter 506 may be an otherwise conventional process variable transmitter such as commercially available from Invensys Systems, Inc. (Foxboro, Mass.), which includes the aforementioned $IIR_1$ 18, processor 26, and optionally, $IIR_2$ 22, as shown in phantom.

Figure 8:
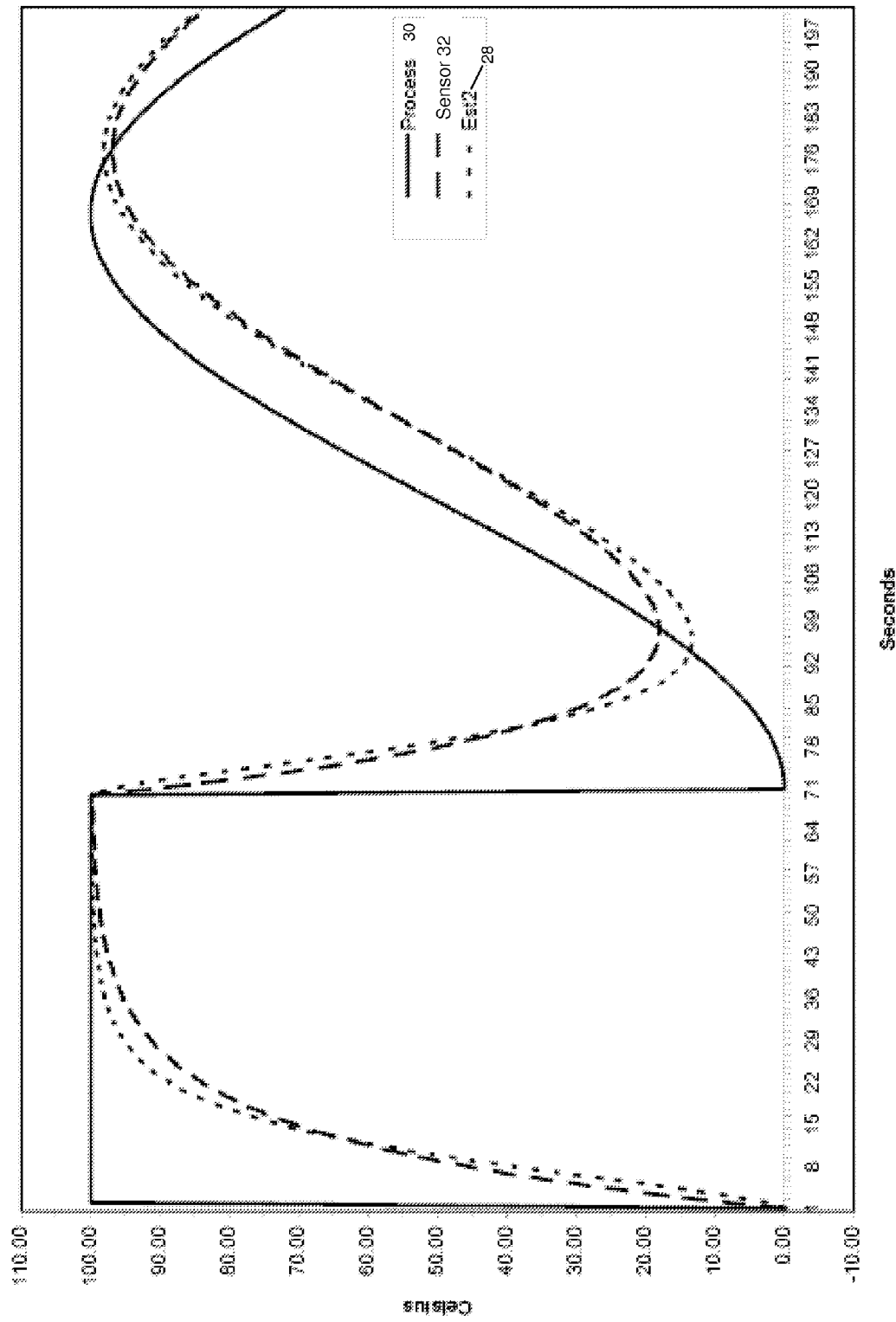
FIG. 8 is a chart of a computer modeled results associated with an embodiment of the invention.

Turning to FIG. 8, the inventor tested embodiments of their invention such as shown and described with respect to FIGS. 3A-3B, with computer modeling of a hypothetical process fluid. Temperature in degrees Celsius (y axis) is represented as a function of time in seconds (x axis). The actual process temperature 30 is represented by the solid line. The chart represents process fluid at 100° C. (e.g., boiling water) being sent through a conduit, followed by process fluid of 0° C. (e.g., ice water) at approximately 71 seconds. The process temperature line 30 thereby follows a step form. The chart also represents a gradual raising and lowering of the temperature of the process fluid, so that process temperature line 30 forms a sine wave.

In this example, the above-described $T_{estimate}$ 28 more closely tracks the solid process line 30. Although $T_{estimate}$ 28 slightly lags the process 30, $T_{estimate}$ 28 comes close to the amplitude of the actual process temperature. The chart indicates that $T_{estimate}$ 28 reached 100° C. at about 50 seconds, and fell to about 15° C. at about 95 seconds. Since the process fluid 30 was rising in temperature at 95 seconds, $T_{estimate}$ 28 did not fall in temperature to the low of 0° Celsius.

This computer model also allowed the inventor to compare $T_{estimate}$ 28 to the temperature ($T_{detected}$) 16 detected by the temperature sensor, (represented in this FIG. 8 by dashed line 32). It may be seen that than $T_{estimate}$ 28 is appreciably better than $T_{detected}$ line 32 at capturing the full amplitude (high and low amplitude) of temperature swings of process 30.

Figure 9:
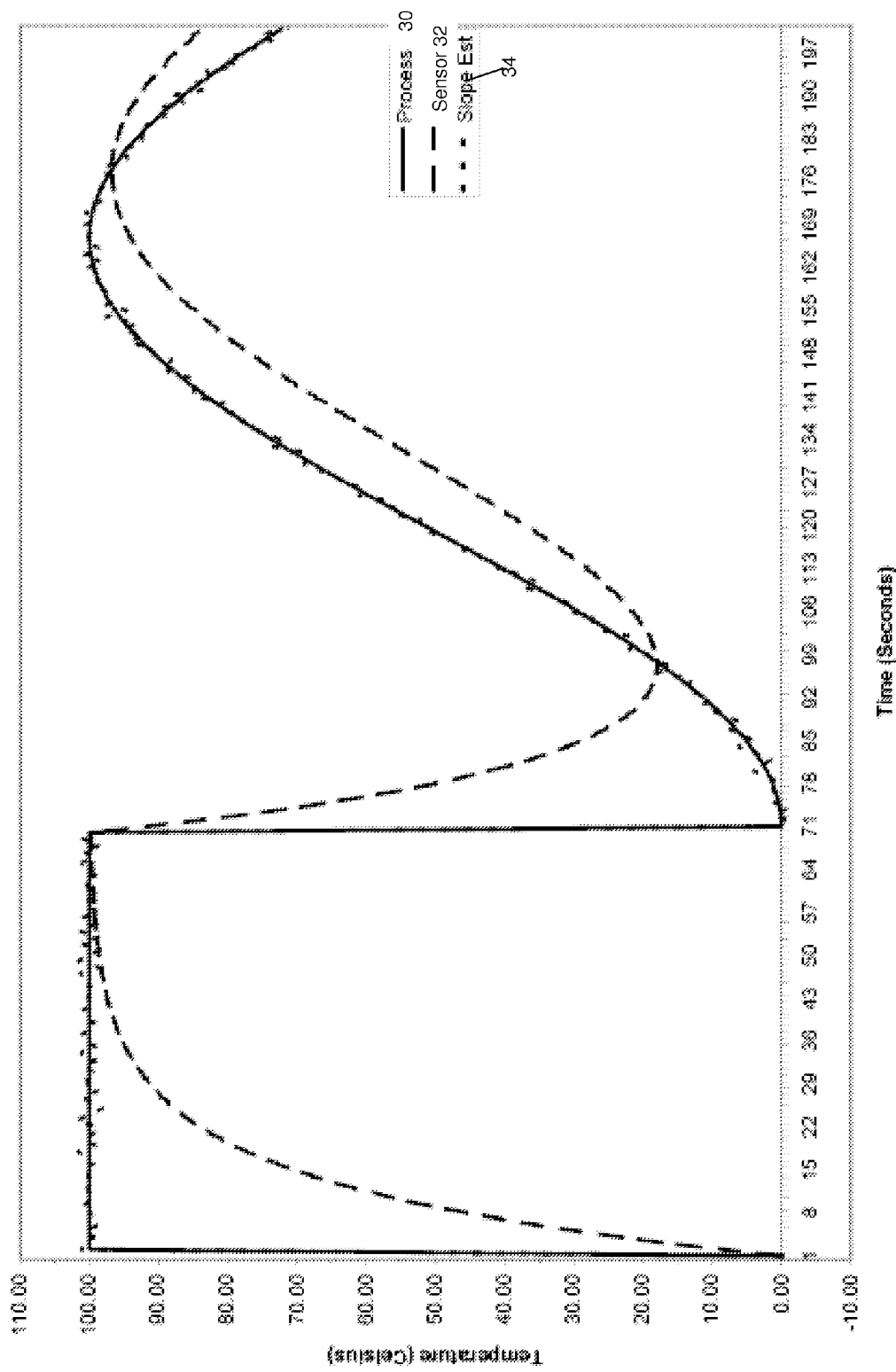
FIG. 9 is a chart of a computer modeled results associated with another embodiment of the invention.

Turning now to FIG. 9, any of the foregoing embodiments may use another aspect of predicting the process temperature, which involves the slope of the changes in temperature detected by the sensor. The inventor experimented with simulations of process fluid in a conduit, with the process flow flowing past the casing. During experimentation with the computer models of FIGS. 4 and 5, using the configuration shown and described with respect to FIGS. 3A, 3B, the inventor discovered that the slope of the sensor line 32 is proportional to the difference between the sensor temperature readings, and the actual process temperature. The inventor discovered that the following Equation 5 may be used to further enhance the estimated result, in which slope ($Q_{estimatefinal}$) estimate 34 is determined by multiplying the slope of the sensor output ($Q_{detected}$) line 32 by a predetermined constant K, and adding the result to the sensor line 32.

$$Q_{estimatefinal} = (\text{Slope} Q_{detected} \times K) + (Q_{detected}) \quad \text{Eq. 5}$$

As can be seen from the embodiment of FIG. 9, the slope estimate 34 closely tracks the actual process fluid temperature 30, nominally without any delay, to effectively compensate for the physical impediment (e.g., time delay caused by an RTD casing, etc.) to provide nominally true, real time results. This embodiment thus effectively anticipates what temperature the sensor will detect before the temperature is actually detected. As also shown, nominally the full amplitude of the process fluid temperature is captured.

In this particular example, the value used for the constant K was 40. It should be recognized, however, that constant K is related to the thermal time constant τ discussed above. As such, the value of constant K is expected to change based on the particular application, and may be determined by empirical testing as discussed hereinabove.

It may be seen that in this particular example, slope estimate 34, rather than forming a clear line, appears to be somewhat scattered around the process temperature 30. This may reflect noise which has become part of the slope estimate.

Therefore, processor 26 may be further programmed with a conventional smoothing algorithm, e.g., which averages or uses standard deviations of the data to smooth out the estimate 34 for enhanced clarity.

Various embodiments of the present invention have been shown and described herein with reference to use of an electronic sensor 14, such as an RTD. It should be recognized, however, that substantially any type of sensor, including mechanical (e.g., pneumatic), electro-mechanical, and/or electro-chemical sensors/control systems, may be used without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

Having described the invention, what is claimed is:

1. A system for predicting a physical quality with an impediment to accurate measurement, comprising:
   a sensor configured to detect, in real time, the physical quality ($Q_{detect}$), wherein measurement of the physical quality is subject to a time-related impediment;
   a first infinite impulse response filter configured to filter $Q_{detect}$ and to output a first filtered quality measurement ($Q_{filtered1}$);
   a processor configured to calculate, in real time, the estimated quality $Q_{estimate}$ using $Q_{detect}$ and $Q_{filtered1}$; a second infinite impulse response filter configured to filter $Q_{filtered1}$ and to output a second filtered quality measurement ($Q_{filtered2}$);
   wherein said processor is configured to calculate the estimated quality $Q_{estimate}$ using $Q_{filtered1}$ and $Q_{filtered2}$; an additional infinite impulse response filter configured to filter $Q_{filtered1}$ and to output an additional filtered quality measurement ($Q_{filteredadd}$);
   wherein said processor is configured to calculate the estimated quality $Q_{estimate}$ using $Q_{filteredadd}$; and wherein said processor is configured to calculate the estimated quality $Q_{estimate}$ using the formula $Q_{estimate} = Q_{detect} + (Q_{detect} - Q_{filtered2}) + (Q_{detect} - Q_{filteredadd})$.

2. The system of claim 1, wherein the quality comprises temperature of a material and the impediment comprises a barrier disposed between the sensor and the material.

3. The system of claim 2, wherein the material comprises a process fluid and the barrier comprises a casing disposed about the temperature sensor, wherein the casing is configured for extension into process fluid flow.

4. The system of claim 3, comprising:
   a second infinite impulse response filter configured to filter $Q_{filtered1}$ and to output a second filtered quality measurement ($Q_{filtered2}$); and
   wherein said processor is configured to calculate the estimated quality $Q_{estimate}$ using $Q_{filtered1}$ and $Q_{filtered2}$.

5. The system of claim 4, comprising no more than one temperature sensor.

6. The system of claim 4, comprising an additional infinite impulse response filter.

7. The system of claim 4, wherein said first infinite impulse response filter is configured to employ a first time constant ($\tau_1$) correlated to the time-related impediment.

8. The system of claim 7, wherein said second infinite impulse response filter is configured to employ a second time constant ($\tau_2$) correlated to the time-related impediment.

9. The system of claim 8, wherein $\tau_2$ is greater than or substantially equal to $\tau_1$.

10. The system of claim 1, wherein said processor is configured for calculation of $Q_{estimate}$ by subtracting the value of $Q_{filtered2}$ from twice the value of $Q_{filtered1}$.

11. The system of claim 1, wherein said processor is configured for calculation of $Q_{estimate}$ by calculating the difference between $Q_{filtered1}$ and $Q_{filtered2}$, and adding the difference to $Q_{filtered1}$.

12. The system of claim 1, wherein said processor is configured for recording of a plurality of data points of $Q_{detected}$ over time.

13. The system of claim 12, wherein said processor is configured for determining the slope of $Q_{detected}$ at the plurality of data points.

14. The system of claim 13, wherein said processor is configured for determining $Q_{estimate}$ using the slope of $Q_{detected}$ at said plurality of data points.

15. The system of claim 14, wherein said processor is configured for determining a final value for $Q_{estimate}$, denoted as $Q_{estimatefinal}$, by the formula $Q_{estimatefinal} = (\text{Slope} Q_{detected} \times K) + (Q_{estimate})$, wherein K is a constant having a value correlated to the time-related impediment.

16. A method for transforming physical quality data into an estimated measured quality, comprising:
   a) obtaining, with a sensor in real time, data representing a physical quality ($Q_{detect}$), wherein an impediment exists to the detection of the physical quality;
   b) filtering $Q_{detect}$ through a first IIR filter ($IIR_1$), wherein the IIR outputs $Q_{filtered1}$;
   c) calculating, with a processor in real time, the estimated measured quality ($Q_{estimate}$) using ($Q_{filterd1}$ and $Q_{detect}$; and
   d) filtering $Q_{filtered1}$ through another infinite impulse response filter configured to output another filtered quality measurement ($Q_{filtered2}$); and
   wherein said calculating (c) includes calculating the estimated quality $Q_{estimate}$ using $Q_{filtered1}$ and $Q_{filtered2}$.

17. The method of claim 16, wherein said obtaining (a) comprises obtaining, with a temperature sensor, data representing a physical quality ($Q_{detect}$) in the form of temperature, wherein the impediment comprises a barrier disposed between the temperature sensor and the material; and said filtering (b) and calculating (c) is effected by a temperature compensation transmitter.

18. The method of claim 17, wherein the material comprises a process fluid and the barrier comprises a casing disposed about the temperature sensor, wherein the casing is configured for extension into process fluid flow.

19. The method of claim 18, further comprising:
   e) disposing the temperature sensor within the casing; and
   f) inserting the casing into the process fluid flow.

20. The method of claim 16, wherein said calculating (c) comprises calculating, with the processor, $Q_{estimate}$ by subtracting the value of $Q_{filtered2}$ from twice the value of $Q_{filtered1}$.

21. The method of claim 16, wherein said calculating (c) comprises calculating, with the processor, $Q_{estimate}$ by calculating the difference between $Q_{filtered1}$ and $Q_{filtered2}$, and adding the difference to $Q_{filtered1}$.

22. The method of claim 16, comprising configuring the infinite impulse response filter to employ a first time constant ($\tau_1$) correlated to the time-related impediment.

23. The method of claim 22, comprising configuring the other infinite impulse response filter to employ a second time constant ($\tau_2$) correlated to the time-related impediment.

24. The method of claim 16, comprising:
   filtering $Q_{filtered1}$ through an additional infinite impulse response filter configured to output an additional filtered quality measurement ($Q_{filteredadd}$); and
   wherein said calculating (c) includes calculating the estimated quality $Q_{estimate}$ using $Q_{filtered1}$ $Q_{filtered2}$ and $Q_{filteredadd}$.

25. The system of claim 24, wherein said processor is configured to calculate the estimated quality $Q_{estimate}$ using the formula $Q_{estimate} = Q_{filtered1} + (Q_{filtered1} - Q_{filtered2}) + (Q_{filtered1} - Q_{filteredadd})$.

26. The method of claim 16, comprising recording, with the processor, a plurality of data points of $Q_{detected}$ over time.

27. The method of claim 26, comprising determining, with the processor, in real time, the slope of $Q_{detected}$ at the plurality of data points.

28. The method of claim 27, wherein said calculating (c) comprises determining $Q_{estimate}$ using the slope of $Q_{detected}$ at the plurality of data points.

29. The method of claim 28, wherein said calculating (c) comprises calculating with the processor in real time, a final value for $Q_{estimate}$, denoted as $Q_{estimatefinal}$, by the formula $Q_{estimatefinal} = (\text{Slope} Q_{detected} \times K) + (Q_{estimate})$, wherein K is a constant having a value correlated to the time-related impediment.

30. A system for predicting a physical quality with an impediment to accurate measurement, comprising:
   a sensor configured to detect, in real time, the physical quality ($Q_{detect}$), wherein measurement of the physical quality is subject to a time-related impediment;
   a first infinite impulse response filter configured to filter $Q_{detect}$ and to output a first filtered quality measurement ($Q_{filtered1}$);
   a processor configured to calculate, in real time, the estimated quality $Q_{estimate}$ using $Q_{detect}$ and $Q_{filtered1}$;
   a second infinite impulse response filter configured to filter $Q_{filtered1}$ and to output a second filtered quality measurement ($Q_{filtered2}$); and
   wherein said processor is configured to calculate the estimated quality $Q_{estimate}$ using $Q_{filtered1}$ and $Q_{filtered2}$;
   wherein the quality comprises temperature of a material and the impediment comprises a barrier disposed between the sensor and the material;
   wherein the material comprises a process fluid and the barrier comprises a casing disposed about the temperature sensor; and
   wherein the casing is configured for extension into process fluid flow.

31. The system of claim 30, comprising no more than one temperature sensor.

32. The system of claim 30, comprising an additional infinite impulse response filter.

33. The system of claim 30, wherein said first infinite impulse response filter is configured to employ a first time constant ($\tau_1$) correlated to the time-related impediment.

34. The system of claim 33, wherein said second infinite impulse response filter is configured to employ a second time constant ($\tau_2$) correlated to the time-related impediment.

35. The system of claim 34, wherein $\tau_2$ is greater than or substantially equal to $\tau_1$.

36. The system of claim 35, wherein said processor is configured for calculation of $Q_{estimate}$ by subtracting the value of $Q_{filtered2}$ from twice the value of $Q_{filtered1}$.

37. The system of claim 35, wherein said processor is configured for calculation of $Q_{estimate}$ by calculating the difference between $Q_{filtered1}$ and $Q_{filtered2}$, and adding the difference to $Q_{filtered1}$.

38. A method for transforming physical quality data into an estimated measured quality, comprising:
- a) obtaining, with a sensor in real time, data representing a physical quality $Q_{detect}$), wherein an impediment exists to the detection of the physical quality;
- b) filtering $Q_{detect}$ through a first IIR filter ($IIR_1$), wherein the $IIR_1$ outputs $Q_{filtered1}$;
- c) calculating, with a processor in real time, the estimated measured quality ($Q_{estimate}$) using $Q_{filtered1}$ and $Q_{detect}$; and further comprising recording, with the processor, a plurality of data points of $Q_{detected}$ over time and determining, with the processor, in real time, the slope of $Q_{detected}$ at the plurality of data points.

39. The method of claim 38, wherein said calculating (c) comprises determining $Q_{estimate}$ using the slope of $Q_{detected}$ at the plurality of data points.

40. The method of claim 34, wherein said calculating (c) comprises calculating with the processor in real time, a final value for $Q_{estimate}$, denoted as $Q_{estimatefinal}$, by the formula $Q_{estimatefinal} = (SlopeQ_{detected} \times K) + (Q_{estimate})$, wherein K is a constant having a value correlated to the time-related impediment.

41. A system for predicting a physical quality with an impediment to accurate measurement, comprising:
- a sensor configured to detect, in real time, the physical quality ($Q_{detect}$), wherein measurement of the physical quality is subject to a time-related impediment;
- a first infinite impulse response filter configured to filter $Q_{detect}$ and to output a first filtered quality measurement ($Q_{filtered1}$);
- a processor configured to calculate, in real time, the estimated quality $Q_{estimate}$ using $Q_{detect}$,
- wherein said processor is configured for recording of a plurality of data points of $Q_{detected}$ over time; and
- wherein said processor is configured for determining the slope of $Q_{detected}$ at the plurality of data points.

42. The system of claim 41, wherein said processor is configured for determining $Q_{estimate}$ using the slope of $Q_{detected}$ at said plurality of data points.

43. The system of claim 42, wherein said processor is configured for determining a final value for $Q_{estimate}$, denoted as $Q_{estimatefinal}$, by the formula $Q_{estimatefinal} = (SlopeQ_{detected} \times K) + (Q_{estimate})$, wherein K is a constant having a value correlated to the time-related impediment.

* * * * *